Figure 1:
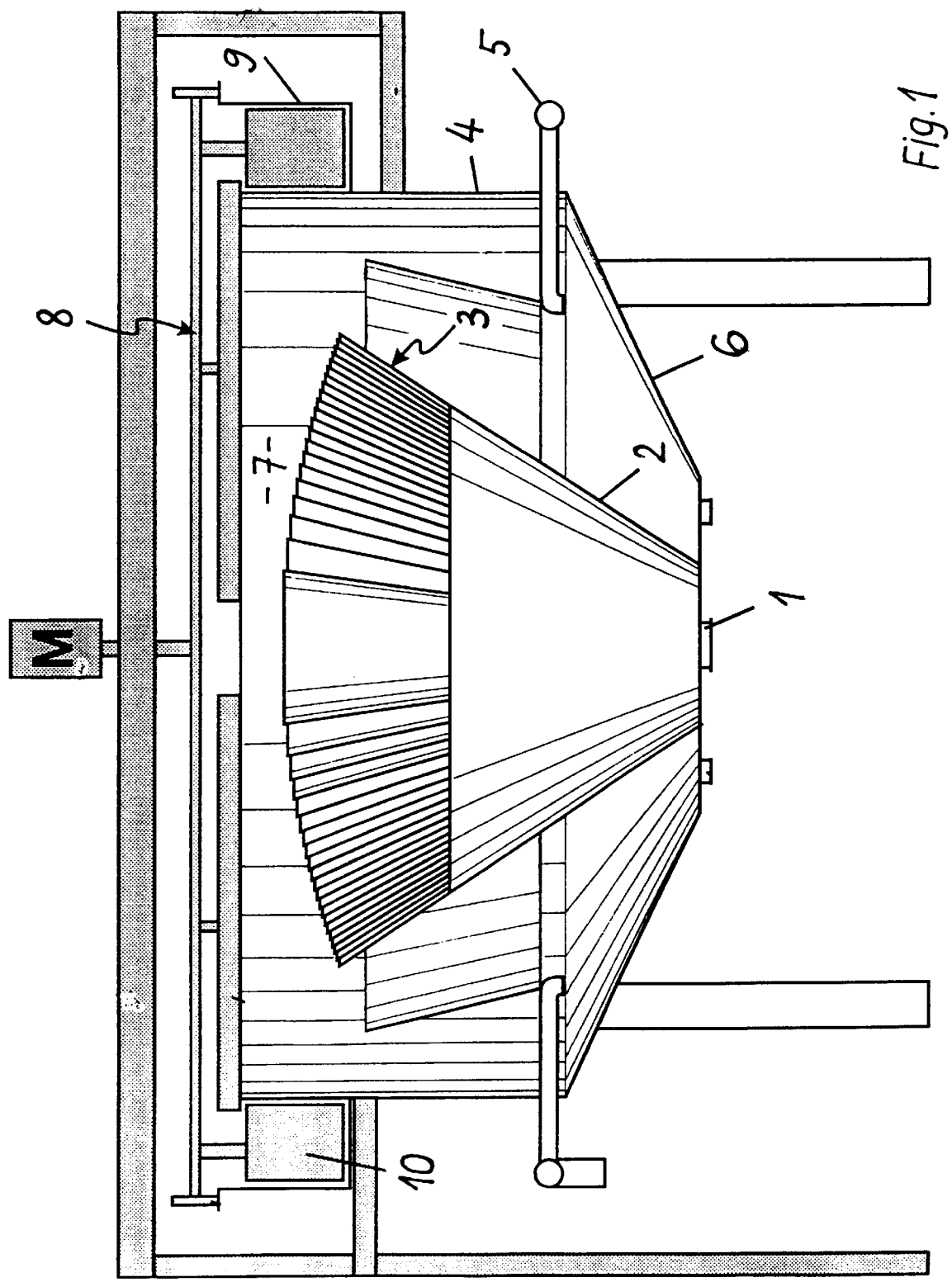

United States Patent [19]

Suša

[11] Patent Number: 6,083,389
[45] Date of Patent: Jul. 4, 2000

[54] FLOTATION PLANT

[75] Inventor: Janez Suša, Cesta v Lipovce 33A, Ljubljana-Brezovica, Slovenia, 1351

[73] Assignee: Janez Suša, Ljubljana-Brezovica, Slovenia

[21] Appl. No.: 09/180,334

[22] PCT Filed: Apr. 16, 1997

[86] PCT No.: PCT/SI97/00013

§ 371 Date: Nov. 5, 1998

§ 102(e) Date: Nov. 5, 1998

[87] PCT Pub. No.: WO97/41961

PCT Pub. Date: Nov. 13, 1997

[30] Foreign Application Priority Data

May 6, 1996 [SI] Slovenia ............................ P-9600144

[51] Int. Cl.[7] ...................................................... C02F 1/24
[52] U.S. Cl. .................................. 210/221.2; 210/221.1; 210/522
[58] Field of Search ............................ 210/221.2, 221.1, 210/521, 522; 209/170

[56] References Cited

U.S. PATENT DOCUMENTS 3,828,935  8/1974  Rovel .
4,931,175  6/1990  Krofta .
5,268,099  12/1993  Krofta et al. .
5,296,149  3/1994  Krofta .
5,660,718  8/1997  Chudacek et al. .

FOREIGN PATENT DOCUMENTS 3031755   3/1981   Germany .
9600143   12/1997  Slovenia .
505439    9/1976   U.S.S.R. .
1183180   10/1985  U.S.S.R. .
97/41962  11/1997  WIPO .

Primary Examiner—Thomas M. Lithgow
Attorney, Agent, or Firm—Jacobson, Price, Holman & Stern, PLLC

[57] ABSTRACT

In a flotation plant comprising an intake installation (1), a flocculation section (2), a separating section (4), a water discharge installation (5), a sedimentation section, a slurry collecting section (7), a scraper (8) for the slurry, a trough (9) for the slurry, and pushers (10) for conveying the same, a laminating section (3) is incorporated between the flocculation section (2) and the slurry collecting section (7). The laminating section (3) is composed of a plurality of equiaxial divergent circular-section members arranged to form, on the one hand, mutually equal base areas and, on the other hand, mutually equal exit areas of the respective annuli. Both the flocculating section (2) and the laminating section (3) are positioned centrally inside a cistern (4, 6) of the flotation plant.

11 Claims, 3 Drawing Sheets

FLOTATION PLANT

The present invention relates to a flotation plant, particularly for treating waste waters, which comprises an intake installation, a flocculation section, a laminating section composed of a plurality of equiaxial divergent circular-section members, a separating section, a water discharge installation, a sedimentation section, a slurry collecting section, a scraper for the slurry, a trough for the slurry and pushers for conveying the same.

In patent U.S. Pat. No. 4,931,175 to Krofta a Water Clarifying Apparatus is disclosed having a cylindrical tank where particulate contaminants suspended in raw water are separated using flotation techniques. A set of concentric mutually spaced, conical plates are positioned in the flotation tank. The plates rotate about the tank, preferably in unison with (i) a header that distributes equal quantities of raw water to each annular zone in the tank defined by the conical plates and (ii) a scoop for removing the contaminants which form a floated sludge layer.

It is a drawback of the known apparatus that the plates constituting a laminating section, i.e. a main section of the apparatus, rotate. Namely, the rotating assembly is submersed; no approach is possible in order to maintain e.g. the bearings, which means that special bearings or special lubricating arrangements are required.

Besides, the known apparatus operates by the decompressing of air dissolved in water. To this end, a portion of clarified water must be returned into the process. Approximately 30 to 40% of the capacity of the apparatus is involved thereby, which results in respective reduction of the efficiency and increase of energy consumption.

It is an object of the present invention to avoid the disadvantages of the prior art and to provide a flotation plant creating a uniform flow pattern of a fluid through all its passages in a continuous operation, preferably a laminar flow pattern of the fluid downstream from the intake chamber of the plant.

According to this invention, a laminar flow pattern is obtainable under the following conditions.

The laminating section is arranged to form, on the one hand, mutually equal base areas and, on the other hand, mutually equal exit areas of the respective annuli.

The exit areas of the laminating section are 1.4 times larger than the base ones.

The base i.e. intake areas of the annuli of the laminating section all reside in a horizontal plane, and the upper i.e. exit areas of the annuli of the laminating section are arranged to form a hemisphere.

The laminating section is supported by an intake vessel. The intake vessel of the flocculating section and the outer divergent member of the laminating section form a uniform divergent member.

A bottom member of the intake vessel and a bottom member of a flotation cistern are integral and arranged in a common horizontal plane.

The total exit area of the laminating section equals the mantle surface of a virtual cylinder defined by the largest diameter of the laminating section and by the height clearance between the laminating section at the location of the said largest diameter and the upper edge of the cistern.

The total exit area of the laminating section also equals an intake gap of an annulus in the horizontal plane between the laminating section and the cistern.

The cistern provides an upper, cylindrical part and a lower, funnel-shaped part with the connection site between the said two parts being located at a level approximately corresponding to a half of the height of the flocculating section.

A horizontal annulus area at the location corresponding to the connection site of the cylindrical part and the funnel-shaped part of the cistern is 1.5 times larger than the horizontal annulus area of the intake gap existing between the laminating section and the cistern.

In the height region approximately corresponding to the connection site between the two parts of the cistern, a floccule-free water discharge collecting installation is arranged, which is composed of a torus-type tube arranged around the cistern, said tube being connected by radial discharge tube arms at mutually equidistantly arranged locations to the respective annulus of the cistern.

Figure 2:
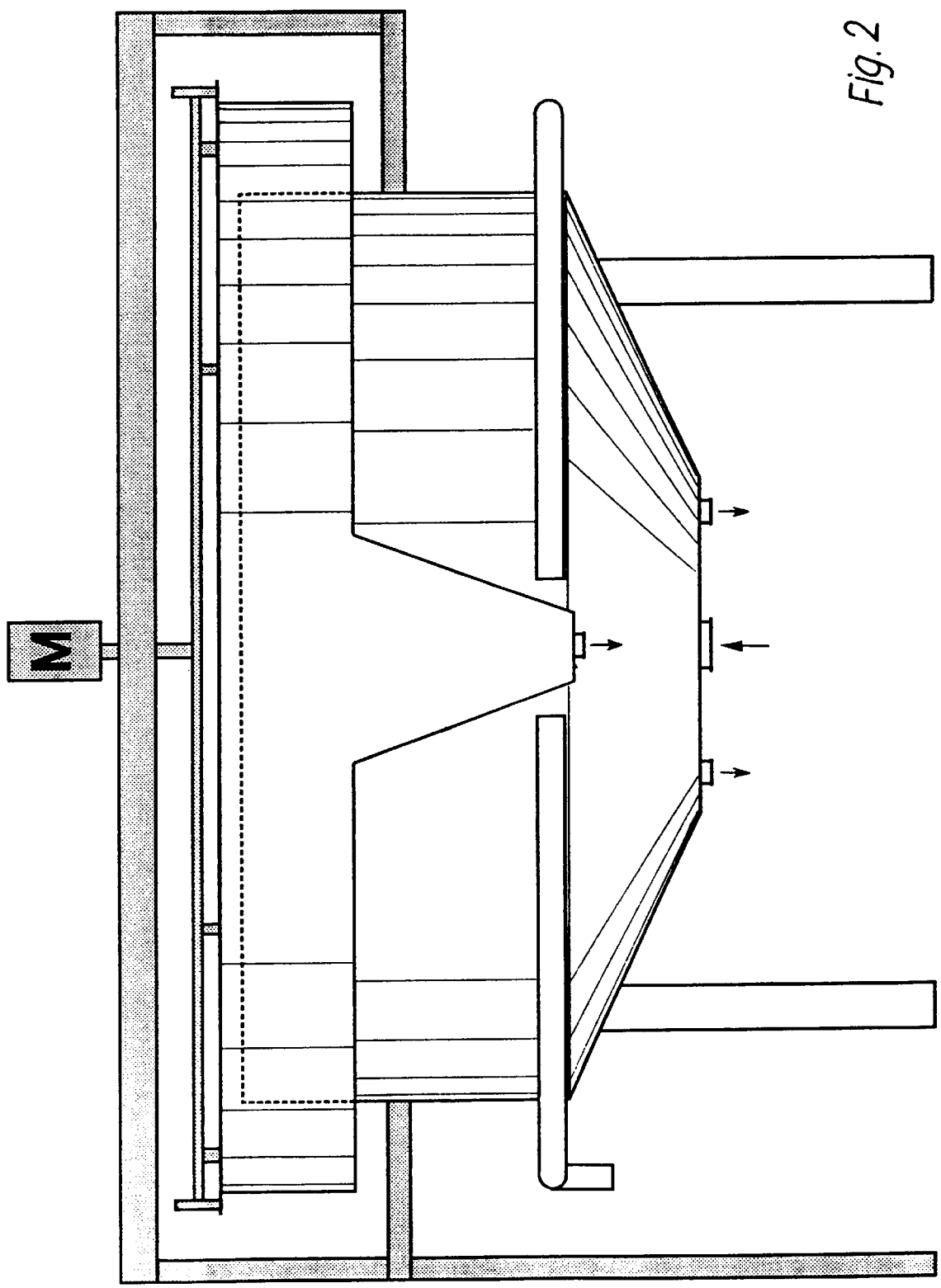
Figure 3:
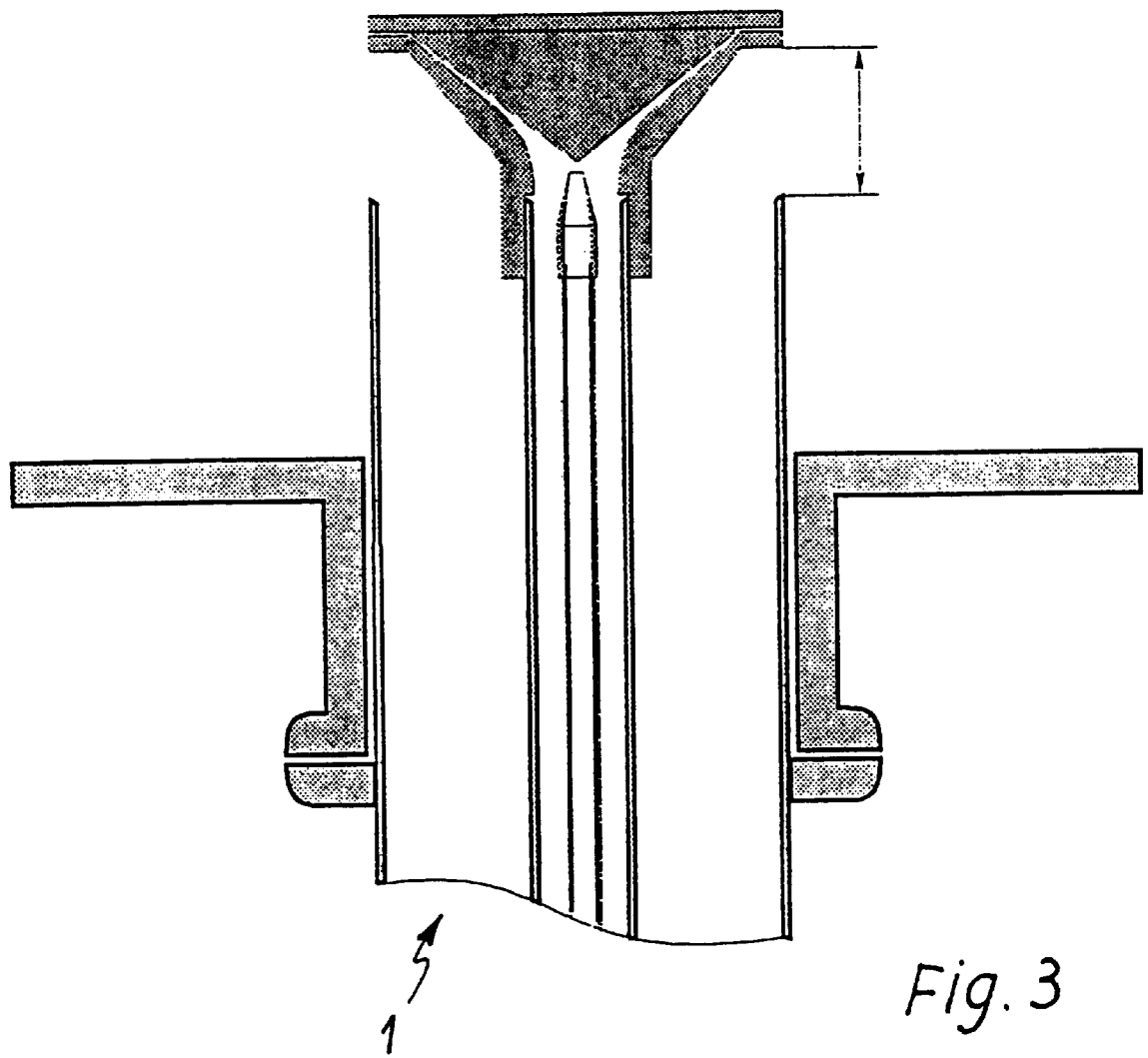

Hereinafter, the invention is disclosed in detail by means of an illustrative embodiment shown in the drawing. In the drawing:

FIG. 1. is an elevational axial section of the flotation plant of the invention, FIG. 2. is an elevational sideview of the flotation plant of FIG. 1, and FIG. 3 is an elevational axial section of the intake installation.

The flotation treatment starts in an upright intake vessel where a flocculating section 2 of the flotation plant is created. Basically, the said vessel is circular in its cross section and divergent in its axial direction.

A bottom member of the said vessel, preferably integral with a bottom member of a flotation cistern 4, 6, accommodates an intake installation 1 (FIG. 3), which, according to the invention, is a special supplying assembly comprising an outer tube—for supplying waste water including a flocculating agent being added prior to entering the vessel—and an inner self-suction dispersing nozzle i.e. a special device which by means of a forcing central water stream sucks the air conveyed through a coaxial outer tube.

The said self-suction dispersing nozzle is the object of a parallel patent SI 9600143 and a respective patent application WO 97/41962 (PCT/SI97/00014) here considered as a reference.

The said supplying assembly evidently creates two annuli—one for waste water and one for air—and a central tube (for the forcing water).

Waste water enters the said flocculating section 2 in the form of a vertical flow dispersed radially under an angle of e.g. 45°. Thereafter, it is crossed by a strong horizontal radial stream of an air-water dispersion created in the said self-suction dispersing nozzle. In the flocculating section 2, waste water is intensively mixed with air bubbles. Floccules are created, to which the bubbles generating the lifting power of the particles adhere.

According to the invention, the said intake vessel supports a superstructure to form a laminating section 3.

The laminating section 3 is composed of a plurality of equiaxial divergent circular-section members arranged to form mutually equal base areas of the respective annuli. The same applies to the exit areas of the said annuli, the exit areas being 1.4 times larger than the base ones.

The outer one of the said divergent members is preferably integral with the vessel of the underlying flocculating section 2, most preferably designed to form a uniform divergent member.

The base (intake) areas of the annuli of the laminating section 3 all reside in a horizontal plane. In contrast, the upper (exit) areas of the annuli of the laminating section 3 are preferably arranged to form a hemisphere.

Both the flocculating section 2 and the laminating section 3 are positioned centrally inside the cistern 4, 6 of the flotation plant.

The upper edge of the cistern 4 resides at a higher level than the upper edge of the inner divergent member of the laminating section 3 so that over the laminating section 3 a slurry collecting section 7 of the flotation plant is created.

The total exit area of the laminating section 3 equals the mantle surface of a virtual cylinder defined by the largest diameter of the laminating section 3 and by the height clearance between the laminating section 3 at the location of the said largest diameter and the upper edge of the cistern 4. The same flowing area is also provided in the horizontal plane by the intake gap of the annulus between the laminating section 3 and the cistern 4.

The cistern 4, 6 is—in addition to the bottom member already mentioned—suitably composed of an upper, cylindrical part 4 and a lower, funnel-shaped part 6. The connection site between the said two parts 4, 6 is suitably located at a level corresponding to a half of the height of the flocculating section 2. The region of the cistern inside the cylindrical part 4 is foreseen to definitely separate water from floccules and to eventually collect water free of floccules, and the region of the cistern inside the funnel-shaped part 6 is foreseen to collect the sediment. To this end, in the region of the connection site of the cylindrical and the funnel-shaped parts 4, 6 of the cistern a discharge collecting installation 5 is arranged, and in the bottom member of the cistern outlets for a temporary removing of the sediment are arranged.

The discharge collecting installation 5 is composed of a torus-type tube arranged around the cistern of the flotation plant, the said tube being connected by radial discharge tube arms at (eight) mutually equidistantly arranged locations to the floccule-free water compartment.

By means of an intermediate funnel-shaped member arranged in the said separating and floccule-free water compartment in the height region below the largest diameter of the laminating section 3 and supported by the said radial discharge tube arms, the floccule-free water compartment of the cistern 4 is divided into two annuli.

The lower area of the separating and floccule-free water compartment of the cistern is suitably 1.5 times larger than the upper, intake one. Such a design results in reducing the vertical velocity of the fluid, which contributes to the separation effect.

A slurry collecting section 7 is the upper section of the plant over the laminating section 3 and the separating annulus, which provides the collecting and draining of the slurry. The layer of slurry thickens and gets thicker from the centre to the periphery of the cistern. In the middle and at the periphery the respective thicknesses of the slurry layer amount to approximately 5 cm and 25 cm.

A scraper 8 for scraping the slurry is designed as a cross member having doctor blades attached thereto. The angle formed by a doctor blade and a tangent to the circular periphery of the cistern is adjustable. Thereby the intensity of removing the slurry can be controlled. The doctor blades are inclined under an angle of 45° in the direction of cutting the slurry. Along the edge of the slurry collecting section 7, where the thickness of slurry is the highest, the slurry is displaced by doctor blades into a trough 9.

A horizontal trough 9 is arranged along the periphery of the slurry collecting section 7. The trough 9 provides a funnel-shaped discharge member (FIG. 2) with an adapter to connect a slurry pump, arranged at the bottom thereof.

Each of the four arms of the scraper 8 supports a pusher member positioned inside the trough 9 for pushing the slurry along the trough 9 up to the discharge member thereof.

The flotation plant functions as follows.

A turbulent flow of floccules and waste water of the flocculating section 2 is converted into laminar sub-flows in the laminating section 3. Volume flows through individual annuli are mutually equal and they add up in radial direction at the exit site of the laminating section 3. A constant flow velocity of the fluid in radial direction is obtainable by the upper hemispherical surface of the laminating section 3. The flow velocity of the fluid is constant downstream from the laminating section 3 through the slurry collecting section 7 up to the intake into the separating section. Along the separating section the flow velocity decreases.

What is claimed is:

1. A flotation device comprising a flotation tank having a bottom wall and a side wall an intake installation (1) for feeding waste water and air into a lower portion of the tank, means defining a flocculation section (2) which comprises a generally open topped cone shaped member, a laminating section (3) at the top of the flocculation section (2) which comprises a plurality of equiaxial divergent circular-section members, said side wall of the flotation tank extending over said laminating section (3) for collecting a slurry above said laminating section (3) and below a scraper (8), a separating section (4) provided with a water discharge installation (5) arranged adjacent a bottom section of said side wall of the flotation tank, and a sedimentation section provided at the bottom of said separating section (4), wherein said laminating section (3) is arranged to form, on the one hand, mutually equal base areas and, on the other hand, mutually equal exit areas of the respective annuli.

2. Flotation device as in claim 1, wherein the exit areas of said laminating section (3) are 1.4 times larger than the base areas.

3. Flotation device as in claim 1, wherein said base areas are intake areas and wherein said base areas of the annuli of the laminating section (3) all reside in a horizontal plane, and the upper, i.e. exit areas of the annuli of the laminating section (3) are arranged to form a hemisphere.

4. Flotation device as in claim 1, wherein said laminating section (3) is supported by said bottom wall of the flotation tank.

5. Flotation device as in claim 4, wherein said means defining the flocculating section (2) and the outer divergent member of the laminating section (3) form a uniform divergent member.

6. Flotation device as in claim 4 wherein said means defining the flocculation section (2) includes a bottom member, said bottom member and said bottom wall of the flotation tank are integral and are arranged in a common horizontal plane.

7. Flotation device as in claim 6, wherein the total exit area of said laminating section (3) i.e. the sum of its horizontal exit orifice areas of the annuli and a central orifice area equals a mantle surface ($S = \pi \times D \times H$; $\pi = 3.14$) of an imaginary cylinder defined by a largest diameter (D) of the laminating section (3) and a height clearance (H) between said laminating section (3) (at the location of said largest diameter) and the upper edge of said side wall of the flotation tank.

8. Flotation device as in claim 6, wherein the total exit area of said laminating section (3) equals an intake gap of an annulus in the horizontal plane between said laminating section (3) and said side wall of the flotation tank.

9. Flotation device as in claim 6, wherein said side wall of the flotation tank is generally cylindrical and said bottom wall provides a funnel-shaped part with the connection site between said two walls of the flotation tank being located at a level approximately corresponding to a half of the height of said flocculating section (2).

10. Flotation device as in claim 8, wherein a horizontal annulus area at the location corresponding to the connection site of the cylindrical part of said side wall of the flotation tank and the funnel-shaped part of said bottom wall of the flotation tank is approximately 1.5 times larger than the horizontal annulus area of the intake gap between said laminating section (3) and said side wall of the flotation tank.

11. Flotation device as in claim 9, wherein the height region approximately corresponding to the connection site between the bottom wall and the side wall of the flotation tank, said water discharge installation (5) is a floccule-free water discharge collection installation and comprises a torus-type tube arranged around said flotation tank, said tube being connected by radial discharge tube arms at mutually equidistantly arranged locations to the respective annulus of said flotation tank.

* * * * *